United States Patent [19]

Inuzuka et al.

[11] Patent Number: 4,704,894
[45] Date of Patent: Nov. 10, 1987

[54] RESONATING KNOCK SENSOR

[75] Inventors: Shozin Inuzuka; Shuji Yamashita, both of Aichi, Japan

[73] Assignee: NGK Spark Plug Co., Ltd., Aichi, Japan

[21] Appl. No.: 804,451

[22] Filed: Dec. 4, 1985

[30] Foreign Application Priority Data

Dec. 5, 1984 [JP] Japan .................. 59-257122

[51] Int. Cl.⁴ .................. G01L 23/22; G01H 11/08
[52] U.S. Cl. .................. 73/35; 310/326; 310/329
[58] Field of Search .................. 73/35, 651, 654; 310/326, 327, 329

[56] References Cited

U.S. PATENT DOCUMENTS

| 4,254,354 | 3/1981 | Keem | 73/35 |
| 4,374,472 | 2/1983 | Nishimura | 73/35 |
| 4,393,688 | 7/1983 | Johnston et al. | 73/35 |
| 4,409,816 | 10/1983 | Yamaguchi et al. | 73/35 |
| 4,502,332 | 3/1985 | Sheridan et al. | 73/35 |

FOREIGN PATENT DOCUMENTS 139030 8/1983 Japan .................. 73/35

*Primary Examiner*—John Chapman
*Attorney, Agent, or Firm*—Finnegan, Henderson, Farabow, Garrett and Dunner

[57] ABSTRACT

A resonating knock sensor comprising a piezoelectric element attached as an integral part to one surface of a thin metal sheet to make a vibration sensing unit, which is supported within a casing to be installed on an engine. A damping member is joined to the vibration sensing member.

6 Claims, 10 Drawing Figures

RESONATING KNOCK SENSOR

BACKGROUND OF THE INVENTION

The present invention relates to a resonating knock sensor that is secured to a suitable place within an internal combustion engine such as, for example, the wall of the cylinder, for the purpose of detecting the occurrence of knocking within the cylinder.

A knock sensor of the type contemplated by the present invention consists of a vibration sensing unit that is supported within a casing to be installed on an engine and which comprises a piezoelectric element attached as an integral part to one surface of a thin resonating metal sheet. The vibration sensing unit has a resonance frequency equal to the frequency of the oscillating wave from knocking, so that when knocking occurs, the piezoelectric element will vibrate in an effective manner to produce a maximum output in accordance with this vibration.

Unlike the non-resonating type that senses knocking by imposing a compressive strain on a fixed piezoelectric element in synchronism with the vibration from knocking, the resonating knock sensor does not produce oscillations in synchronism with the vibration of the thin metal sheet and, instead, the profile of the vibratory output obtained has slow rise and fall times in that the amplitude of the oscillating wave gradually increases after the occurrence of knocking and gradually decreases after completion of the knocking. The electronic circuit for this sensor has a certain threshold and any oscillations that occur within the rise and fall times and which are below the threshold value are processed as noise components. Therefore, if knocking that has a waveform containing a few number of peaks occurs, no output signal can be detected from the sensor since the vibration will disappear before it reaches the threshold level.

On the other hand, if the engine is running at an increased rotational speed and knocking occurs at very short intervals, the falling component of the vibration resulting from one knock will be superposed on the rising component of the vibration from the next knock, and the amplitude of the overall vibration is increased to produce a higher noise level. In order to ensure accurate detection of such knocking-associated vibration, the threshold value for distinguishing any noise from the desired signal is determined by averaging the noise components, but then the threshold level is increased to degrade the S/N ratio of the sensor. A clearer picture of this phenomenon will be obtained from FIG. 4; if knocking occurs at fairly long intervals, the threshold value T will be proper in connection with the first signal S1, but if the interval of knocking decreases, the valley V of the signal will be elevated because of the superposition of the falling component of the first wave on the rising component of the subsequent wave. In order to avoid any disadvantages that may result from this superposition, the circuit for the sensor is so designed that the threshold level is determined by averaging the noise components below the value T, but then this provides a higher value of T. Eventually, the difference between the peak output of a signal S4 and the threshold level T becomes so small as to cause a progressive decrease in the S/N ratio. In other words, the higher the rotational speed of the engine and the shorter the interval of the occurrence of knocking, the more degraded the S/N ratio is.

In spite of these serious disadvantages, the resonating knock sensor is extensively used because it does not have to use an electrical filter, which is indispensable to the non-resonating type, and enables simplified signal processing.

SUMMARY OF THE INVENTION

The primary object, therefore, of the present invention is to provide a resonating knock sensor that undergoes a minimum number of the defects of the conventional device.

The resonating knock sensor of the present invention comprises a vibration sensing unit that consists of a piezoelectric element attached as an integral part to one surface of a thin metal sheet and which has a damping member joined to said thin metal sheet.

The damping member used in the present invention may be made of any material that is capable of increasing the damping factor $\zeta$ of the vibration sensing unit, such as, for example, rubber, a porous material like a foamed of fibrous material, or a spring.

BRIEF DESCRIPTION OF THE DRAWINGS

Embodiments of the knock sensor of the present invention are shown in the accompanying drawings, wherein.

DETAILED DESCRIPTION OF THE PREFERRED EMBODIMENTS

Figure 5A:
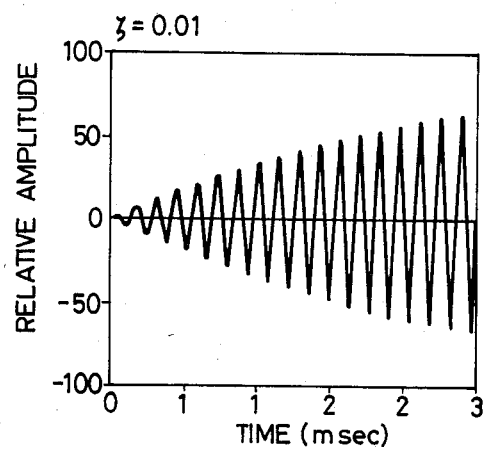
FIGS. 5(a), (b) and (c) are graphs showing the relationship between the damping factor $\zeta$ and the amplitude of vibration.
Figure 5B:
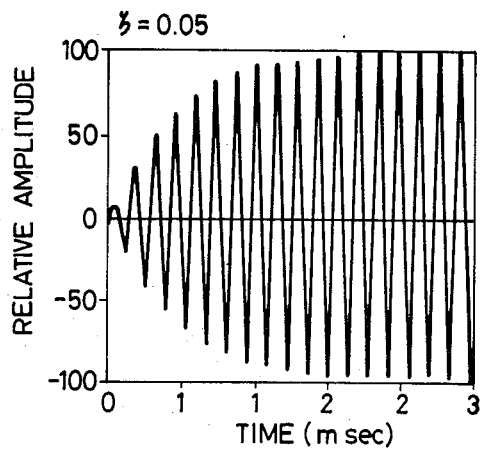
Figure 5C:
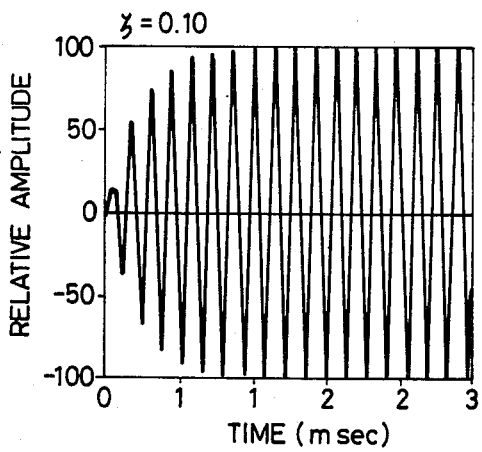

FIG. 5 contains graphs showing the response characteristics of three vibration sensing units having different values of damping factor that were vibrated at 6 kHz; in each graph, the x-axis represents time and the y-axis plots the proportion of the amplitude of vibration at a specific time to the saturated value (peak amplitude). FIGS. 5(a), (b) and (c) represent the characteristics for $\zeta=0.01$, 0.05 and 0.10, respectively. As is clear from comparison of these graphs, the higher the value of $\zeta$, the more rapid the rising of an output signal, which is also true with the falling of the same signal.

Figure 1:
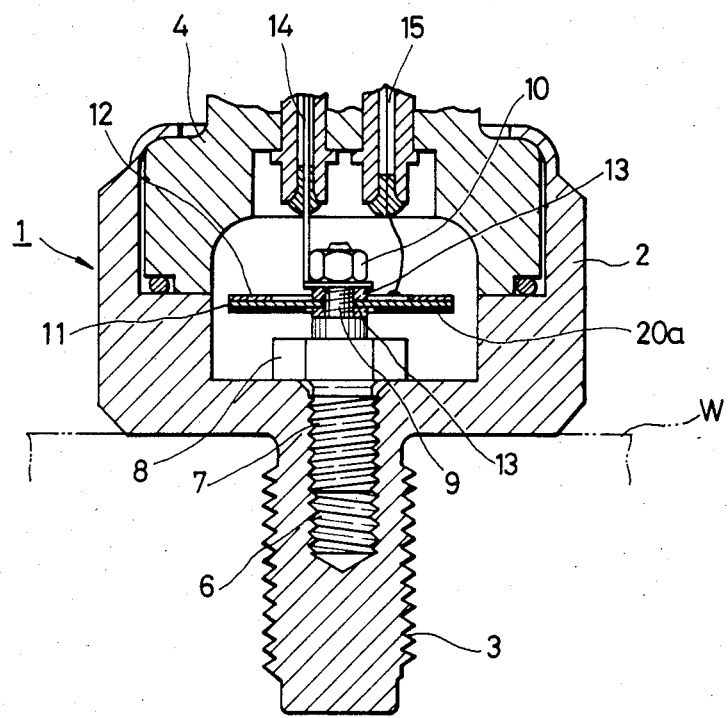
FIG. 1 is a side elevational view of the sensor in accordance with one embodiment.

In order to demonstrate this effect, two resonating knock sensors having basically the same construction as shown in FIG. 1 were fabricated and a series of knocks were produced to obtain curves for the falling and rising components of the resulting vibrations. One of the two sensors employed no damping member, while the other sensor was equipped with a damping member (silicone rubber) that was attached to the underside of a thin metal sheet in accordance with one embodiment of the present invention, whereby the damping factor, $\zeta$, of the vibration sensing unit was increased.

Experimental Conditions

Thin metal sheet: O.D., 15.2 mm; I.D., 2 mm; thickness, 0.3 mm

Piezoelectric element: O.D., 15.2 mm; I.D., 2 mm; thickness, 0.3 mm

Silicone rubber: O.D., 15.2 mm; I.D., 5 mm; thickness, 1 mm

Applied frequency: 5.7 kHz.

Figure 6A:
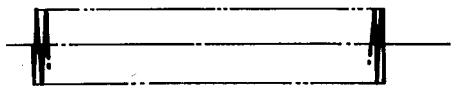
FIG. 6(a) is a diagram showing the waveform of an input vibration.
Figure 6B:
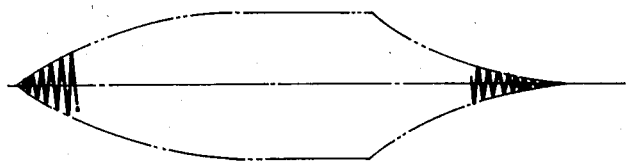
FIG. 6(b) is a diagram showing the waveform of an output signal delivered from a sensor using no damping member.
Figure 6C:
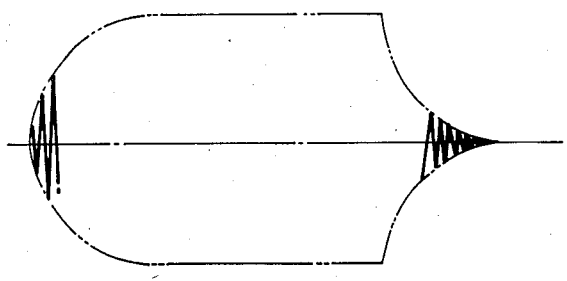
FIG. 6(c) is a diagram showing the waveform of an output signal produced from a sensor using a damping member according to the present invention.

The waveform of the vibration applied is shown in FIG. 6(a). FIG. 6(b) shows the waveform of the resulting output signal produced from the sensor employing no damping member, and FIG. 6(c) depicts the waveform of the output signal from the sensor having a damping member 1 mm thick (silicone rubber) attached to the underside of the thin metal sheet. Comparison between FIGS. 6(b) and (c) clearly shows that the rising and falling characteristics of the output signal from the sensor employing the damping member were appreciably improved over those of the output from the conventional device using no such damping member.

As a further advantage, the sensor employing the damping member provided a resonant frequency band of 580 Hz which has considerably broader than that available from the conventional system (140 Hz). This indicates that the sensor of the present invention provides a great latitude in operation in the face of variations in the frequency of the vibration from knocking.

The general layout of the construction of a knock sensor incorporating the concept of the present invention is hereunder described with reference to FIG. 1. A cup-shaped body 2 is provided on the bottom with a stud bolt 3 that is to engage a hole made in the wall W of the cylinder. Body 2 is fitted with a cap 4 to make a casing 1 within which is formed a space for installation. A threaded hole 6 in the bottom of the body 2 engages with a retainer bolt 7 that is made of an insulating material and threaded into hole. Bolt 7 has a hexagon head 8 from which a stepped screw rod 9 extends upward. A thin annular metal sheet 11 has an annular piezoelectric element 12 attached to the top face, whereby a vibration sensing unit is formed. The metal sheet 11 has a center through-hole that is fitted over the screw rod 9 and engages the same at the step, and which is securely fastened with a nut 10 threaded onto the screw rod 9, whereby the metal sheet 11 is supported above the retainer bolt. The metal sheet 11 is sandwiched between two washers 13 that are fitted over the screw rod 9. Cap 4 receives grounding terminal 14 and an output lead wire 15 that penetrate the cap. Terminal 14 is connected to the upper washer 13 that is electrically connected to the metal sheet 11 while the lead wire 15 is connected to the electrode on the piezoelectric element 12.

When knocking occurs, the wall W of the cylinder vibrates, in response to which the casing vibrates and the metal film 11 oscillates in a curved form, producing a curved distortion in the overlying piezoelectric element 12, which then delivers through the lead wire 15 an output signal which is generally proportional to the amount of the applied distortion.

Various embodiments of the sensor of the present invention are hereunder described.

In the device shown in FIG. 1, a damping member 20a made of silicone rubber is attached to the underside of the metal sheet 11. The shape of this damping member and its function were described above.

Figure 2:
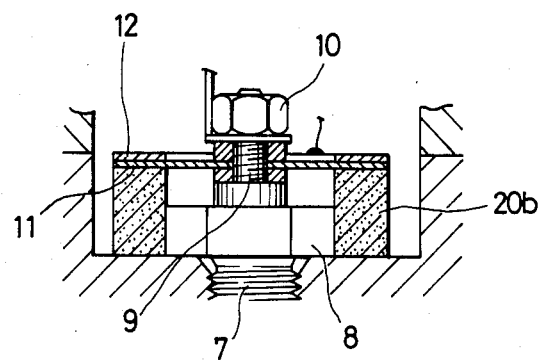
FIGS. 2 and 3 are side elevational views showing the essential parts of the sensor in accordance with two other embodiments of the invention.

FIG. 2 shows an embodiment employing a damping member made of foam rubber 20b, which is in the form of a short tube and is slipped over the retainer bolt 7 in order to be held between the thin metal sheet 11 and the bottom of the threaded body 2. In this case, it is essential that the height of the rubber tube 20b is either equal to or slightly greater than the gap between the metal sheet 11 and the bottom of the body 2. Foam rubber 20b is merely one example of the porous material that can be used as the material for the damping member; many other porous materials such as fibrous materials may also be used.

Figure 3:
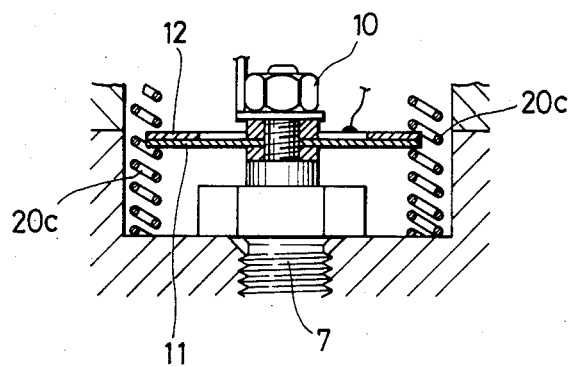
Figure 4:
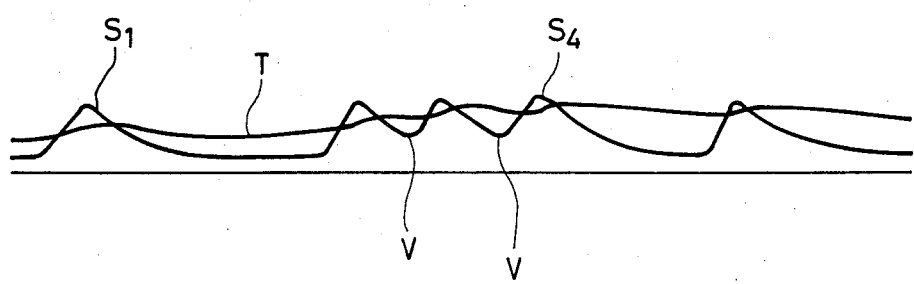
FIG. 4 is a diagram showing the waveform of an output signal produced from the conventional device.

FIG. 3 shows another embodiment where the damping member is formed of a spring 20c, which is loaded between the bottom of the body 2 and underside of the cap 4 so that the periphery of the combination of the metal film 11 and the piezoelectric element 12 is held between two adjacent turns of the coil in the springs.

Another example of the damping member that can be used in the present invention is a coating of resin material that is applied to all or part of the surface of the thin metal sheet 11.

The damping member may be joined to the vibration sensing unit by various other methods such as, for example, by inserting said member between the thin metal sheet 11 and the piezoelectric element 12. In this modified case, the damping member is advantageously made of a thin ring of rubber.

By means of employing any of the aforementioned damping members, the damping factor, $\zeta$, of the vibration sensing unit is sufficiently increased to produce a vibration pattern having a shape similar to that depicted in FIG. 6(c).

The resonating knock sensor of the present invention that employs a damping member joined with the thin metal sheet 11 produces an output signal having rapid rising and falling characteristics. As a result, the sensor achieves the following advantages:

(a) a knocking-associated output signal containing a few peaks in the waveform rises rapidly to reach a predetermined threshold value in a short period for the purpose of accurately sensing the vibration from the knock; and (b) even if knocking occurs at short intervals, the superposition of the rising output on the falling output can be minimized to provide steep valleys in the waveform, whereby any possible increase in the threshold value is inhibited to ensure an improved S/N ratio.

We claim:

1. A resonating knock sensor for an engine, comprising:

a casing including means for mounting said casing on said engine;

a mounting rod fixed in said casing;

a thin metal sheet having first and second opposite planar surfaces attached at a central location to said mounting rod, said metal sheet surrounding said rod and spaced from said casing, said sheet being operative to vibrate upon vibration of the engine, casing and mounting rod in response to knocking of the engine;

an annular piezoelectric element having first and second opposite planar surfaces, said first surface integrally attached to and in intimate contact with said first surface of said thin metal sheet, said piezoelectric element surrounding and spaced from said rod, said piezoelectric element operative to vibrate with said metal sheet;

an elastic damping member having a predetermined configuration mounted on and surrounding said rod and in physical engagement with one of said second surfaces for elastically damping the vibration of said thin metal sheet and piezoelectric element; and terminal means for electrically sensing the vibrations of said piezoelectric element.

2. The resonating knock sensor according to claim 1 wherein said damping member comprises a planar annular member bonded to the surface of one of said second surfaces, said annular member being made of an elastic material.

3. The resonating knock sensor according to claim 1 wherein said damping member comprises a short cylindrical tube held between one of said second surfaces and a surface of said casing, said cylindrical tube being made of an elastic material.

4. The resonating knock sensor according to claim 1 wherein said damping member comprises a coil spring having opposite ends mounted on said casing, said spring engaging a periphery of said metal sheet between two adjacent turns of said coil.

5. The resonating knock sensor according to claim 1 wherein said thin metal sheet is disc shaped.

6. The resonating knock sensor according to claim 1 wherein said damping member is annularly spaced from said mounting rod.

* * * * *